July 18, 1950   J. W. DAWSON ET AL   2,515,634
ELECTRICAL SYSTEM
Filed March 14, 1942

Inventors
John W. Dawson,
Hans Klemperer
by Elmer J. Gorn
Atty.

Patented July 18, 1950

2,515,634

UNITED STATES PATENT OFFICE 2,515,634

ELECTRICAL SYSTEM

John W. Dawson, West Newton, and Hans Klemperer, Belmont, Mass., assignors to Raytheon Manufacturing Company, Newton, Mass., a corporation of Delaware Application March 14, 1942, Serial No. 434,670

16 Claims. (Cl. 320—1)

This invention relates to electric systems employing recurrent charging of an energy storing means as condensers, charges being used for any convenient purpose, for example discharge into resistance welding loads, and it deals especially with the problem of properly correlating the discharging periods and the recharging periods.

It is one of the objects of the invention to improve the operation of such a system by substantially preventing any of the current which tends to charge the condenser from passing through the load circuit, particularly the welding transformer.

Another object is to exclude recharging of the condenser from the time when the condenser discharge begins until a predetermined time well beyond the peak value of the discharge, in accurate yet simple and reliable manner.

In one of its aspects, the invention provides with certainty for the separation of charging current supply and load circuits by preventing the charging current from entering the discharge circuit, by making it possible to hold off the charging current until after the condenser is substantially discharged or otherwise ineffective with regard to the load.

In other aspects the invention is particularly applicable to condenser welding systems with discharge control tubes as described and claimed in copending application Serial No. 309,124 of John W. Dawson, filed December 14, 1939, now Patent No. 2,508,103, dated May 16, 1950, which systems employ a series tube for connecting condenser and load and a shunt tube for terminating the load current with aperiodic decay, so that the welding current becomes substantially unidirectional. The present invention provides in such welding systems safe deionization of the series tube prior to recharging and prevents by-passing of the charging current through the series tube and welding transformer. Further, proper ignition of the shunt tube is promoted by allowing the load circuit to be inherently less oscillatory than it would have to be if a charging current were supplied during the flow of current in the load circuit.

Figure 1:
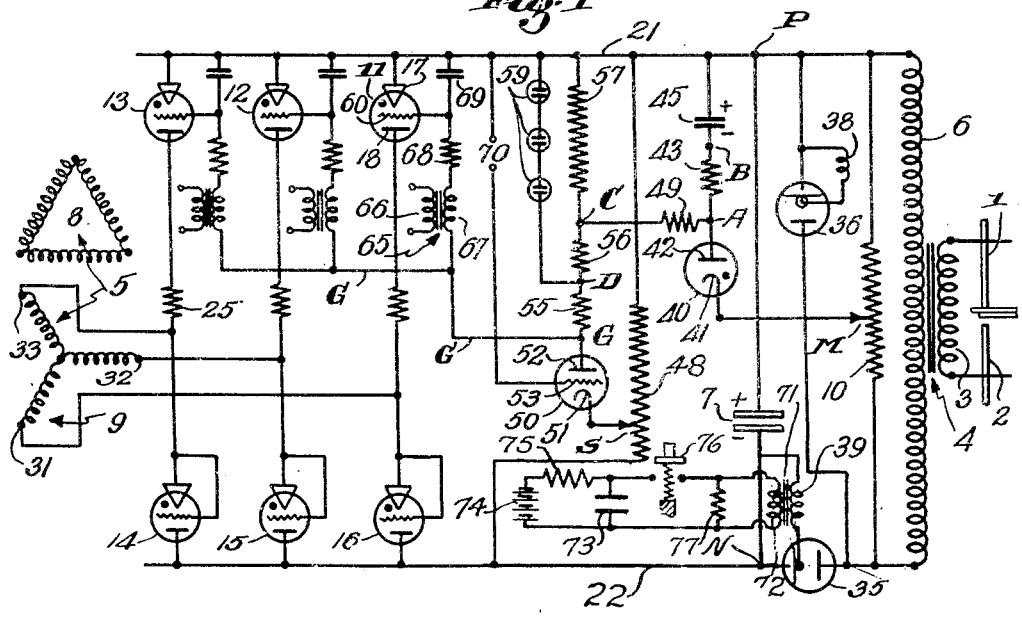
Figure 2:
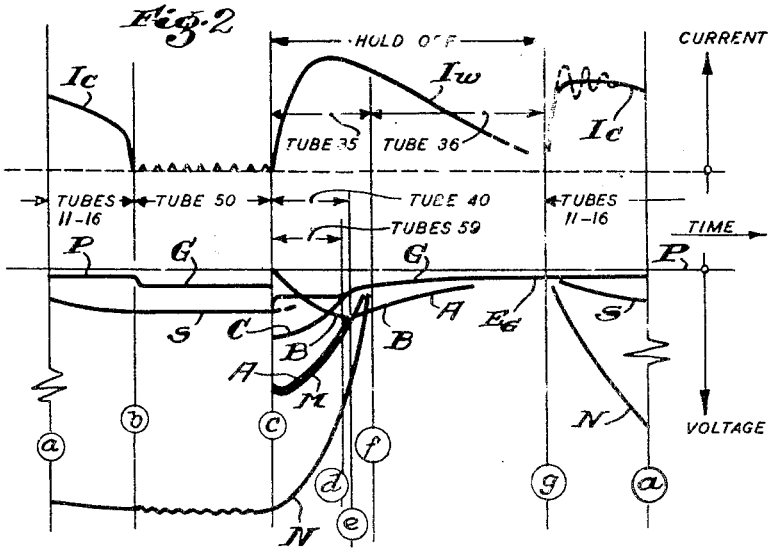
Figure 3:
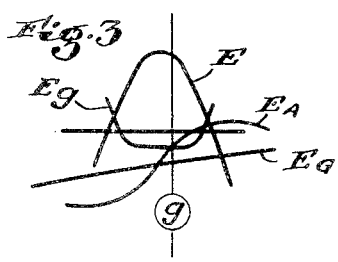

These and other objects, aspects and advantages will be apparent from the following description of a typical embodiment of our invention, shown for the purpose of illustration in the accompanying drawing, in which:

Fig. 1 is a diagram of a resistance welding system incorporating the invention; and Figs. 2 and 3 are sets of curves illustrating the operation of apparatus according to Fig. 1.

In the example illustrated in Fig. 1, current is to be supplied in suitable manner to a pair of resistance welding electrodes 1, 2 forming the output circuit of the secondary winding 3 of a welding transformer 4. The primary winding 6 of the transformer is arranged for energization by discharges from a condenser 7 charged with unidirectional current derived, for example, from a three phase alternating current source indicated by transformer primary 8.

The unidirectional current may be supplied by a rectifier system consisting of a plurality of controlled rectifier tubes 11 to 16 of the gas or vapor filled type with control grid for determining the initiation of the rectifier discharge during the periods when the rectifier anode is positive. Each rectifier tube has a cathode 17 of the permanently energized type, as for example a thermionic filament, an anode 18 and a control electrode 60. The cathodes of one group of rectifiers 11, 12, 13 may be connected to a common conductor 21 which in turn is connected to the positive side of condenser 7. The anodes of tubes 11, 12, 13 are connected to the respective cathodes of a second group of tubes 14, 15, 16 whose anodes are connected to a second common conductor 22 leading to the negative side of condenser 7. The wires between the anodes and cathodes of the two groups of tubes are connected to the terminals 31, 32, 33 of the secondary 9 of a transformer 5 whose primary 8 is supplied from an alternating current net as mentioned above. It will be evident that the herein shown Y-connected secondary of a delta connected primary can be replaced by any multi-phase transformer system suitable for the purpose at hand. Suitable resistors for preventing an excessive charging rate may be inserted as indicated at 25.

The energy stored in condenser 7 is applied to the load circuit through controlled ignition discharge tube 35 which can be rendered conductive by means of an igniter with suitable control apparatus. This control apparatus includes the secondary winding 39 of an ignition transformer 71 having a primary winding 72 adapted to be supplied with current impulses from the discharge of a condenser 73. Condenser 73 is adapted to be charged to a predetermined voltage through a suitable source of direct current, such as a battery 74, in series with a current-limiting resistance 75. Interposed between the condenser 73 and the primary winding 72 is a pushbutton switch 76 which when connected enables the condenser 73 to discharge through the primary winding 72 to supply a pulse of igniting current thereto. The primary winding 72 preferably has a resistance 77 connected across it.

A similar tube 36 is connected across the primary 6 of welding transformer 4, for the purpose of providing a shunt path for the current in the load circuit which in this manner can be rendered substantially unidirectional with exponential decay. The shunt tube 36 may have an igniter controlled by a circuit arrangement including transformer secondary 38 whose voltage is derived from that of condenser 7 in such a manner that tube 36 is ignited when the voltage of condenser 7 tends to reverse after the discharge current has reached its peak. As soon as the shunt path is established, tube 35 extinguishes, and condenser 7 is effectively disconnected from the discharge circuit. This arrangement is described in the copending application of John W. Dawson, Serial No. 312,712, filed January 6, 1940, now Patent No. 2,483,691, dated Oct. 4, 1949.

Across transformer primary 6 is connected a voltage apportioning resistor 10, herein also referred to as hold-off potentiometer, whose midpoint M is connected to cathode 41 of an electronic tube 40, preferably a gas filled diode. Anode 42 of tube 40 is at A connected to wire 21 through resistor 43 and hold-off condenser 45.

A second resistance 48, herein also referred to as regulator potentiometer, is connected across condenser 7 and has an adjustable tap S connected to cathode 51 of a high vacuum tube 50 whose anode 52 is connected to conductor 21 through three resistors 55, 56, 57. Resistors 56 and 57 are bridged by a device for maintaining fairly constant voltage, as for example three gaseous discharge lamps 59 designed to sustain about 180 volts between points P and D. A resistor 49 connects anode 42 of tube 40 with point C between resistors 56 and 57.

Anode 52 of tube 50 is further connected at G to the control electrodes 60 of rectifier tubes 11, 12, 13 through secondaries 67 of control transformers 65 whose primaries 66 are supplied with alternating current from the main system, for example transformer 5, the phase relation of the voltage of secondaries 67 to that of the current which is supplied to the rectifier tubes being determined by conventional means which are not shown. In series with the control electrodes 60 are further inserted comparatively high resistances 68; the grids 60 are also connected to wire 21 by condensers 69.

The control electrode 53 of tube 50 is connected to a source of direct current indicated at 70, which source is selected to supply a substantially constant reference voltage somewhat higher than that which regulator lamps 59 tend to maintain, for example 190 volts if the regulator lamp voltage is about 180 volts.

The operation of this embodiment of our present invention will now be described with reference to Fig. 2, whose upper diagram indicates the current flow in the system according to Fig. 1 whereas the lower diagram indicates the voltage relations which are characteristic of this circuit.

In the lower diagram of Fig. 2, the voltage variations are given as negative values related to the voltage of terminal P or wire 21. It should be noted that the voltage values could not be drawn to scale; the condenser might be charged to values above 2000 volts, whereas the control elements work at around 200 volts. However, the essential configuration of the transients is correctly shown.

At time $a$, the main rectifier tubes 11 to 16 supply current Ic charging the condenser 7 which gradually attains voltage N. The voltage at tap S of potentiometer 48 likewise increases gradually. Disregarding for the time being transformers 65, the connection G and the grids 60 have essentially the voltage of point P or conductor 21, and hence of cathodes 17, since neither tube 40 nor 50 is conducting. Therefore, tubes 11 to 16 conduct whenever their anodes are positive. As the voltage of S and hence of cathode 51 becomes sufficiently negative relatively to that of grid 53 (which, as above mentioned, is maintained essentially constant for example at 190 volts), tube 50 will begin to conduct. Tube 50 is preferably of a type which does not become conductive to any appreciable amount until the voltage across condenser 7 and hence at point S on cathode 51 has attained a desired value, corresponding to the selected maximum charging voltage of condenser 7. Also, tube 50 is selected to carry appreciable current as soon as it begins conducting.

At time $b$, when 50 begins to conduct, an appreciable voltage drop will appear across resistance 55—56—57, and hence control grids 60 on connection G become sufficiently negative to stop tubes 11 to 16 from conducting, so that the flow of charging current to condenser 7 is considerably diminished. If the condenser voltage N decreases due to leakage, the voltage across 48 decreases accordingly and tubes 11 to 16 may become conductive until the condenser voltage has again risen to its maximum value, the tubes supplying a trickle charge as indicated in Fig. 2 between time lines $b$ and $c$. One or several main rectifier tubes may be provided with decreased grid bias, as described in Patent No. 2,250,102 of July 22, 1941, to Hans Klemperer.

During the time $b$ to $c$, the drop across the resistors 56—57, due to current flow through the tube 50, is insufficient to cause glow tubes 59 to start conducting current.

At time $c$, the welding discharge is initiated for example by rendering tube 35 conductive by applying at 39 a starting potential to its control electrode. As soon as tube 35 permits flow of current through welding transformer 4, the main condenser voltage N and the voltage at mid-point M of resistor 10 decrease with increasing welding current Iw and tube 50 becomes non-conductive as the decreasing voltage at S approaches the constant voltage of grid 53. Tube 40 begins to conduct due to the negative voltage at M and hence on cathode 41. With current passing through tube 40, condenser 45 is charged as indicated in Fig. 2 by the voltage of point B; point C assumes a voltage in accordance with the potential distribution in circuit

N—M—40—A—49—C—57—P

This voltage is sufficient to cause glow lamps 59 to come into action and maintain the voltage at D and hence at G until the voltage at D falls below the lamp voltage. The voltage at G being after $c$ even more negative than during the time from $b$ to $c$, the grids 60 prevent tubes 11 to 16 with certainty from firing, holding off the charging of condenser 7.

At time $d$, lamps 59 extinguish as the voltage at D goes below the critical lamp voltage value, and the voltage at G follows that of C which in turn follows that of A.

At time $e$, condenser 45 is fully charged and begins to discharge in circuit

B—43—A—49—C—57—P and tube 40 becomes again non-conductive with its cathode voltage, determined by that of tap M, and the anode voltage at A approaching each other. The change of the voltage at G follows the condenser discharge as clearly indicated in Fig. 2.

At time $f$, the voltage of condenser 7 is sufficiently reduced to render series tube 35 non-conductive, and shunt tube 36 begins to conduct with the welding current aperiodically decaying therethrough, as above described.

At the time $g$, the voltages at G and correspondingly at grids 60 reach a value sufficiently positive to permit firing of the main rectifier tubes 11 to 16. At this point, the current flow through shunt tube 36 may or may not have ceased, depending on the character of the load circuit; at any rate the recharge has been held off sufficiently long to attain the advantages mentioned above. The condenser 7 is again being charged, the system resuming the condition described above with reference to time $a$.

It will be noted that condenser 45 is quickly energized or charged upon the initiation of the discharge of condenser 7 and then is independently and more slowly discharged through its separate discharge path. The time of such discharge is a constant multiplied by the voltage to which the condenser 45 is charged. The constant is fixed by the resistances 43, 49 and 57 and the voltage is determined by the voltage to which the condenser 7 is charged. This relationship permits the charge hold-off system to perform ideally for the purpose intended.

It will be noted that, without the provisions according to the present invention, the voltage of connection G would have become sufficiently positive after time $c$ to permit firing of rectifiers 11 to 16, when the welding current begins to flow through series tube 35.

A rectifier circuit of the type shown depends primarily on the reactance of the charging transformer to control the current flow when the main condenser system starts to charge at time $g$. As is well known in this art, such currents tend to contain transient values if all grid control is removed from the rectifiers. In order to eliminate such undesirable transients of the charging current supplied by tubes 11 to 16, it is desirable that the firing response be very certain and that the control electrode voltage approach the critical grid voltage at a rate of increase higher than that afforded by the rather gradual change of the voltage of G at time $g$ of Fig. 2. For that purpose, it may be desirable to apply, in accordance with this invention, to the grids 60 an auxiliary alternating current voltage in proper phase relation to the anode current, by means of transformers 65 whose secondaries 67 are, as mentioned before, connected in series with resistors 68 between grids 60 and point G and whose primaries 66 are supplied from the main alternating current net.

As shown in Fig. 3, the alternating current voltage $E_A$ if superimposed on the unidirectional voltage $E_G$ derived from point G, at a phase lag of about 90° relatively to supply voltage E, cuts into the critical grid voltage $E_g$ at a rather steep angle, with the above-mentioned beneficial result.

It will now be evident that the present invention makes it possible to hold off the condenser recharging current for a period which can be predetermined by suitably selecting the characteristics of the circuit containing condenser 45. During this period, line supply and welding transformer are wholly separated, so that a charging current cannot enter the discharge circuit.

Without the provisions according to the invention, the ignition of the shunt tube 36 would tend to be delayed since the charging current, if superimposed on the discharge current, would tend to prevent the condenser 7 from swinging negative and igniting the shunt tube. Hence, if charging current is excluded during the condenser discharge, the load current shifts from the series tube to the shunt tube at the correct time to provide proper exponential decay, when recharging may begin since the load is then separated by the extinguished series tube. If charging current is present prior to the disconnection of the load, the load circuit has to be made more oscillatory in order to provide the low condenser voltage necessary for firing the shunt tube; since it is desirable in welding apparatus of this type to have a load circuit which is as little oscillatory as possible, the charge hold-off is of considerable practical importance.

Further, the secure separation of charging and discharging currents provides for safe deionization of the series tube, prevents by-passing of the charging current through the transformer, and helps the proper current loading of the charging equipment.

It will be noted that the entire operation of the control circuit of this invention is accomplished without the use of moving parts and thus produces a maximum of reliability and durability of operation.

Of course, it is to be understood that this invention is not limited to the particular details described above as many equivalents will suggest themselves to those skilled in the art. It is accordingly desired that the appended claims be given a broad interpretation commensurate with the scope of the invention within the art.

We claim:

1. An electric system comprising means for storing electrical energy, means supplying unidirectional current for charging said storing means, means for controlling the initiation of said charging, a load circuit, means for the discharge of said stored energy into said load circuit, and means responsive to voltage of said load circuit for preventing said charging control means from effecting said initiation during a time period beginning substantially with said discharge.

2. An electric system comprising means for storing electrical energy, means for supplying unidirectional current for charging said storing means, means for controlling the initiation of said charging, a load circuit, means for the discharge of said stored energy into said load circuit, and means responsive to voltage of said load circuit for preventing said charging control means from effecting said initiation substantially during said discharge.

3. An electric system comprising means for storing electrical energy, means supplying unidirectional current for charging said storing means, means for controlling the initiation of said charging, a load circuit, means for the discharge of said stored energy into said load circuit, means responsive to voltage of said load circuit for preventing said charging control means from effecting said initiation during a period substantially coextensive with said discharge, and means responsive to said voltage for extending said period for a predetermined time.

4. An electric system comprising means for storing electrical energy, means for supplying unidirectional current to said storing means, means for the interruption of said current supply while said storing means has a maximum voltage, a load circuit, means for discharging a load current from said storing means into said circuit, means for terminating said load current with aperiodic decay following a discharge peak, and means responsive to voltage of said load circuit for prolonging said current supply interruption past said peak independently of voltage changes in said load circuit.

5. An electric system comprising means for storing electrical energy, means supplying unidirectional current for charging said storing means, means for controlling the initiation of said charging, a load circuit, means for discharging a load current from said storing means into said load circuit, means for the disconnection of said storing means from said load circuit, and means responsive to the voltage change of said load circuit for delaying said charging initiation past said disconnection.

6. An electric system comprising means for storing electrical energy, means supplying unidirectional current for charging said storing means, means for controlling the initiation of said charging, a load circuit, means for discharging a load current from said storing means into said load circuit, means for the disconnection of said storing means from said load circuit after a discharge peak, means including a condenser and a discharge resistance for said condenser, for delaying said current supply initiation past said disconnection, and means for charging said condenser upon said discharge of said storing means, the rate of discharge of said condenser controlling said delay.

7. An electric system comprising means for storing electrical energy, means for supplying unidirectional current for charging said storing means, means for controlling the initiation of said charging, a load circuit, means for discharging a load current from said storing means into said load circuit, means for disconnecting said storing means from said load circuit after a discharge peak and means for delaying said charging initiation past said disconnection, said last-named means being energized through a relatively small time constant circuit, and being deenergized through a comparatively high time constant circuit.

8. An electric system comprising means for storing electrical energy, means for supplying unidirectional current for charging said storing means, means for controlling the initiation of said charging, a load circuit, means for discharging a load current from said storing means into said load circuit after a discharge peak and means including a condenser and discharge circuit for delaying said charging initiation past said disconnection for a time duration equal to a constant times the voltage to which said energy storing means is charged.

9. A system comprising condenser means for storing electrical energy, a source of direct current including electronic rectifier means with control electrode means for charging said condenser means, means responsive to the voltage on said condenser means for impressing on said electrode means voltage values for the initiation of said charging when the voltage of said condenser means decreases, a load circuit, means for discharging said condenser means into said load circuit, a hold-off circuit including a condenser and means for charging said condenser upon said discharge of said condenser means, and means for applying the charge of said condenser to said electrode means for delaying said initiation during the discharge of said condenser.

10. A system comprising condenser means for storing electrical energy, a source of direct current including electronic rectifier means with control electrode means for charging said condenser means, means responsive to the voltage on said condenser means for impressing on said electrode means voltage values for the initiation of said charging when the voltage of said condenser means decreases, a load circuit, means for discharging said condenser means into said load circuit, a hold-off circuit including a condenser and means for charging said condenser upon said discharge of said condenser means, means for deriving a voltage of limited value from said hold-off circuit and for applying said voltage to said electrode means for delaying said initiation during the discharge of said condenser.

11. A system comprising condenser means for storing electrical energy, a source of direct current including electronic rectifier means with control electrode means for charging said condenser means, means responsive to the voltage on said condenser means for impressing on said electrode means voltage values for the initiation of said charging when the voltage of said condenser means decreases, a load circuit, means for discharging said condenser means into said load circuit, a hold-off circuit including a condenser and a condenser discharge circuit, means including an electronic device for charging said condenser upon discharge of said condenser means and for applying the voltage of said condenser to said electrode means for delaying said initiation during the discharge of said condenser.

12. A system comprising condenser means for storing electrical energy, a source of alternating current, electronic rectifier means with control electrode means for charging said condenser means from said source, means responsive to the voltage on said condenser means for impressing on said electrode means voltage values for the initiation of said charging when the voltage of said condenser means decreases, a load circuit connected to said condenser means, means for discharging said condenser means into said load circuit, hold-off means responsive to said discharge of said condenser means for applying a substantially unidirectional hold-off voltage to said electrode means for delaying said initiation independently of said discharge, and means for superimposing on said hold-off voltage an alternating voltage in phase displacement relatively to said source.

13. A system comprising condenser means; a source of alternating current; gas tube rectifier means with control electrode means adapted for charging said condenser means under control of said electrode means; a load circuit; means for initiating the discharge of a load current from said condenser means into said load circuit; means for disconnecting said load circuit from said condenser means following the peak value of said load current and for terminating said load current with aperiodic decay; a hold-off potentiometer across said load circuit; and a diode having a cathode connected to a tap of said hold-off potentiometer, and an anode connected to the positive side of said condenser means through a resistance and through a hold-off condenser in parallel to said resistance; said diode permitting charging of said hold-off condenser upon said initiating of the discharge, and said hold-off condenser maintaining during a predetermined dissipation period said voltage on said resistance and on said electrode means regardless of said discharge, whereby the reinitiation of said charging can be delayed at will.

14. A system comprising condenser means; a source of alternating current; gas tube rectifier means with control electrode means adapted for charging said condenser means under control of said electrode means; a load circuit; means for initiating the discharge of a load current from said condenser means into said load circuit; means for disconnecting said load circuit from said condenser means following the peak value of said load current and for terminating said load current with aperiodic decay; a regulator potentiometer connected across said condenser means; a triode having a cathode connected to a tap of said regulator potentiometer, an anode connected to said electrode means and through a resistance to the positive side of said condenser means, and a grid connected to a substantially constant reference voltage; discharge lamp means for limiting the voltage across said resistance; a hold-off potentiometer across said load circuit; and a diode having a cathode connected to a tap of said hold-off potentiometer, and an anode connected to said resistance and through a hold-off condenser to said positive side; said triode increasing the voltage on said resistance, and hence lowering the voltage of said electrode means and interrupting said charging upon the condenser means voltage reaching a certain value, said diode permitting charging of said hold-off condenser upon said initiating of the discharge, and said hold-off condenser maintaining during a predetermined dissipation period said voltage on said resistance and on said electrode means regardless of the condition of said triode, whereby the reinitiation of said charging can be delayed at will.

15. In combination, an alternating current supply circuit, a load circuit, a capacitance, means for charging said capacitance from said supply circuit and comprising electric valve means having a control member, means for discharging said capacitance to effect energization of said load circuit and comprising a timing circuit for producing a control voltage, and means responsive to said control voltage for impressing on said control member a hold-off voltage to maintain said electric valve means non-conducting during each discharge of said capacitance.

16. In combination, a capacitor, means adapted to function as a source of current in circuit with said capacitor for supplying charging current thereto, valve means interposed between said source and capacitor for controlling the supply of charging current to said capacitor, control means responsive to the potential charge on said capacitor for controlling the conductivity of said valve means so that said valve means is conductive when said capacitor potential is below a preselected magnitude and non-conductive when said capacitor potential is above said preselected magnitude, a normally open discharge circuit connected across said capacitor, means for effecting closing of said discharge circuit until said capacitor is discharged, said discharge circuit reverting to its open condition after said capacitor is discharged, and timing means rendered operable by said closing means and associated with said control means to prevent said valve means from becoming conductive for a predetermined time interval following the closing of said discharge circuit.

JOHN W. DAWSON.
HANS KLEMPERER.

REFERENCES CITED

The following references are of record in the file of this patent:

UNITED STATES PATENTS

| Number | Name | Date |
| --- | --- | --- |
| 2,179,105 | Sidney | Nov. 7, 1939 |
| 2,235,385 | Rava | Mar. 18, 1941 |
| 2,269,460 | Klemperer | Jan. 13, 1942 |